United States Patent [19]

Geraghty et al.

[11] Patent Number: 5,601,029
[45] Date of Patent: Feb. 11, 1997

[54] NONCONTACT LATERAL CONTROL SYSTEM FOR USE IN A LEVITATION-TYPE TRANSPORT SYSTEM

[75] Inventors: John J. Geraghty; Allan P. Poland, both of Lakewood, Colo.

[73] Assignee: The United States of America as represented by the Secretary of the Interior, Washington, D.C.

[21] Appl. No.: 408,796

[22] Filed: Mar. 23, 1995

[51] Int. Cl.⁶ .................................................. B60L 13/06
[52] U.S. Cl. .................................................. 104/284
[58] Field of Search .................................. 104/281, 283, 104/284, 286

[56] References Cited

U.S. PATENT DOCUMENTS

| | | | |
|---|---|---|---|
| 3,937,148 | 2/1976 | Simpson | 104/284 |
| 4,805,761 | 2/1989 | Totsch | 104/286 |
| 4,969,481 | 11/1990 | Kolm | 104/284 |
| 5,170,715 | 12/1992 | Gran | 104/284 |

*Primary Examiner*—Robert J. Oberleitner
*Assistant Examiner*—C. T. Bartz
*Attorney, Agent, or Firm*—E. Philip Koltos

[57] ABSTRACT

A noncontact lateral control system for use in a corridor guided noncontact transport system includes proximity sensors mounted on each side of the container of the transport system operable to continually monitor the lateral position of the container as the container moves through the transport system transit corridor. If the proximity sensors sense that the container has moved laterally within the transit corridor, a control unit associated with the lateral control system provides an energizing signal to one or more electromagnets and the electromagnets move the container laterally within the transit corridor until the container is again centered laterally within the transit corridor.

2 Claims, 3 Drawing Sheets

NONCONTACT LATERAL CONTROL SYSTEM FOR USE IN A LEVITATION-TYPE TRANSPORT SYSTEM

STATEMENT OF GOVERNMENT INTEREST

The invention described herein may be manufactured and used by or for the Government of the United States of America for governmental purposes without the payment of any royalties thereon or therefor.

CROSS REFERENCE TO RELATED APPLICATION

Reference is hereby made to the following copending U.S. application dealing with related subject matter and assigned to the assignee of the present invention: "Corridor Guided Transport System Utilizing Permanent Magnet Levitation", by Allan Poland et al., assigned U.S. Ser. No. 08/408,797 and filed Mar. 28, 1995.

BACKGROUND OF THE INVENTION

1. Field of the Invention

The present invention relates generally to a noncontact levitation-type transport system operable to convey both materials such as mined coal and personnel and in a corridor, more particularly, to such a transport system which incorporates a scheme for controlling the lateral position of the transport system's material or personnel transport container during container movement.

2. Description of the Prior Art

For many years the standard material transport system in underground coal mining utilized to move mined coal between locations has been the conveyor belt. Although conveyor belts are the most cost-effective of current haulage methods, they are well-known to introduce numerous safety hazards into the mining operation. The primary hazard is that of inadvertent worker contact with an operating belt which results in worker injury and in some instances a fatality. Conveyor belt systems may also contribute to the amount of respirable dust to which miners are exposed and have been found to cause mine fires as a result of overheated conveyor belt system rollers or belt friction points. As is apparent, the costs associated with the resultant injuries and fatalities caused by conveyor belt system safety hazards have an adverse affect on both the overall cost of coal production and on employee confidence in the equipment they use on a daily basis.

Another conventional approach to transporting mined coal is the track-bound wheeled transport system which utilizes a motive power-generating engine and rail cars for holding mined coal. This wheeled conveyance system also has shortcomings since all the components are subject to wear and maintenance problems. It has been suggested that a known magnetically levitated transport system using electromagnets in the engine and cars be utilized to transport coal as a replacement to both conveyor belt systems and conventional track systems. However, some of these magnetic levitation systems also rely at least initially on a conventional track and wheel arrangement and must achieve a critical minimum velocity before repulsive levitation is achieved. At speeds below this velocity, for example during acceleration or braking, some known magnetic levitation systems are also wheel and track-bound and are thus subject to the energy consumption and wear and maintenance disabilities of an ordinary train haulage system.

It is apparent from the foregoing that although conventional conveyor belt systems and track bound wheeled transport systems presently utilized to transport coal are adequate, neither of these systems is without their shortcomings. In addition, none of the presently known magnetic levitation systems appear to be a satisfactory replacement to the presently utilized coal transport systems. Consequently, there is generally a need for a new and improved system for transporting coal or other mined materials which minimizes the safety hazards and component wear and maintenance problems associated with these presently known and utilized systems. This new and improved system, free of the shortcomings of known material transport systems, should also be capable of being expanded to the larger field of general transportation.

The novel transport system should take the form of a magnetic levitation system including a material or personnel container movable along some form of track or "transit corridor" in order to avoid the wear and maintenance problems associated with prior art transport systems. If a new magnetic levitation system is provided, it should include some form of control scheme operable to control the lateral position of the material or personnel container within the transit corridor during container movement through the transit corridor.

SUMMARY OF THE INVENTION

The present invention relates to a noncontact lateral control system for use in a levitation-type transport system designed to satisfy the aforementioned needs. The noncontact lateral control system of the present invention "senses" the lateral position of the container within the transit corridor relative to the transit corridor sidewalls during container movement and moves the container in the proper lateral direction to ensure that the center of the container is maintained in alignment with the center of the transit corridor.

Accordingly, the present invention is directed to a noncontact lateral control system for use in a levitation-type transport system designed to satisfy the aforementioned needs.

The levitation-type transport system itself includes a transit corridor having a pair of spaced apart first and second sidewalls and a container having first and second end portions and positioned within the transit corridor. Levitation means in the form of a magnet arrangement associated with the transit corridor and the container is operable to create a repulsive force between the container and the transit corridor of sufficient strength to levitate the container within the transit corridor. Finally, the permanent magnet levitation transport system includes a propulsion system associated with the transit corridor for moving the levitated container through the transit corridor. The noncontact lateral control system of the present invention usable with the above-described transport system includes: (a) first proximity sensor means associated with the first end portion of the container operable to sense the lateral position of the first end portion of the container within the transit corridor relative to the transit corridor first and second sidewalls to provide a first linear output signal means representative of the sensed lateral position of the container first end portion; (b) second proximity sensor means associated with the second end portion of the container operable to sense the lateral position of the second end portion of the container within the transit corridor relative to the transit corridor first and second sidewalls to provide a second linear output signal means representative of the sensed lateral position of the container second end portion; (c) first electromagnet means associated with the container first end portion; (d) second electromagnet means associated with the container second end portion; (e) controller means for receiving the first linear output signal means from the first proximity sensor means, calculating the actual lateral position of the container first end portion based on the value of the first linear output signal means and providing in response to the calculated actual lateral position of said container first end portion within the transit corridor a first output signal to the first electromagnet means operable to energize the first electromagnet means and create a magnetic attraction between the first electromagnet means and one of the transit corridor first and second sidewalls of sufficient strength to move the container first end portion through magnetic action laterally within the transit corridor until said container first end portion is substantially centered laterally within the transit corridor; and (f) controller means for receiving the second linear output signal means from the second proximity sensor means, calculating the actual lateral position of the container second end portion based on the value of the second linear output signal means and providing in response to the calculated actual lateral position of said container second end portion within the transit corridor a second output signal to the second electromagnet means operable to energize the second electromagnet means and create a magnetic attraction between the second electromagnet means and one of the transit corridor first and second sidewalls of sufficient strength to move the container second end portion through magnetic action laterally within the transit corridor until the container second end portion is substantially centered laterally within the transit corridor.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
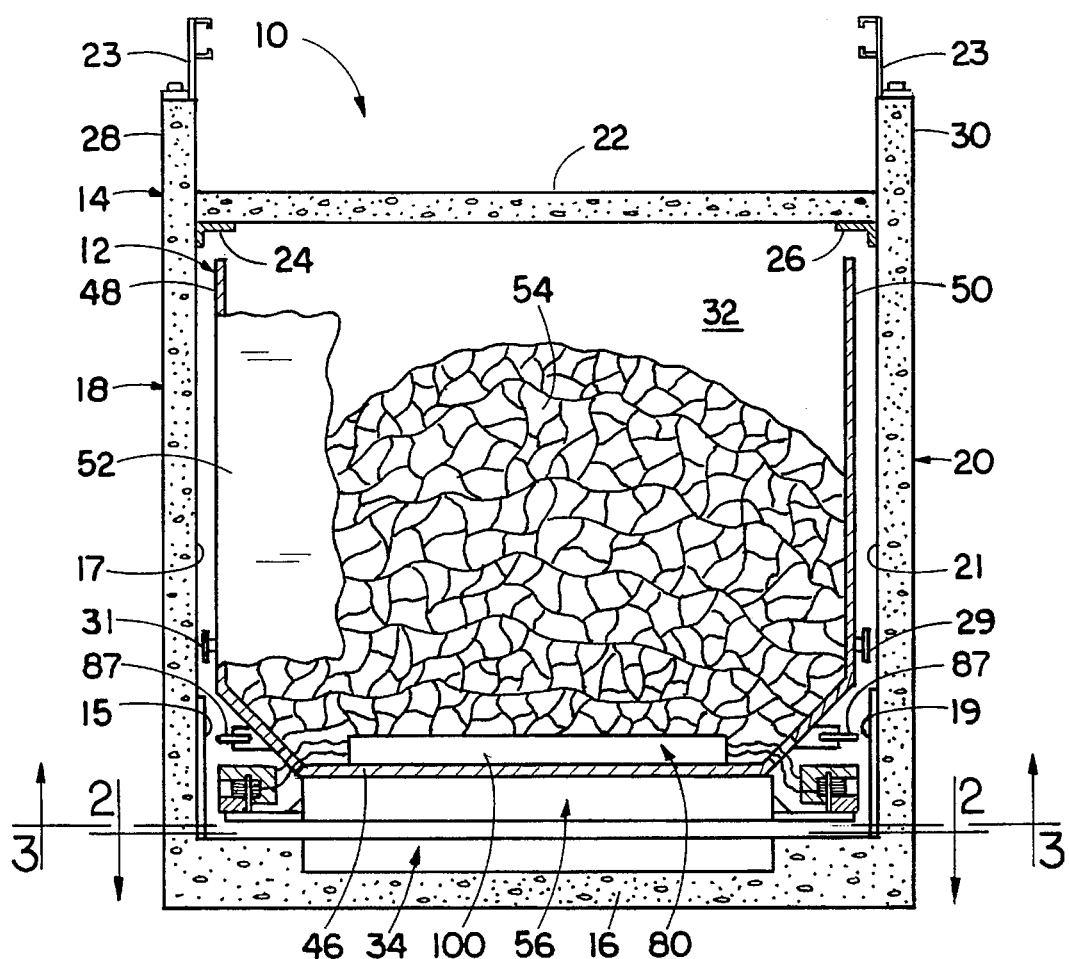
FIG. 1 is an end view, partially in cross-section, of a corridor guided, permanent magnet levitation transport system, illustrating a container magnetically levitated within a transit corridor and the noncontact lateral control system of the present invention positioned at the underside of the container.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Referring to the drawings, and particularly to FIG. 1, there is illustrated an end view, partially is cross-section, of a permanent magnet levitation, corridor guided transport system being generally designated by the numeral 10. As seen in FIG. 1, the corridor guided transport system 10 includes a container 12 positioned within a transit corridor 14. The container 12, which may be utilized to transport coal or other mined materials, or which may be modified to serve as a personnel transport system, is levitated above the transit corridor 14 by magnetic interaction between a series of permanent magnets secured to the container 12 and a series of permanent magnets associated with the transit corridor 14. The use of permanent magnets to effect levitation of the container 12 above the transit corridor 14 results in an essentially frictionless transport system 10 with few moving parts. As a result, the corridor guided transport system 10 experiences low part wear and requires little maintenance.

The transit corridor 14 includes a base 16 and a pair of vertically extending, spaced apart sidewalls 18, 20. A steel plate or siderail 15 is secured to the inside surface 17 of the sidewall 18, and a steel plate or siderail 19 is secured to the inside surface 21 of the sidewall 20. A top wall 22 extends between the pair of spaced apart sidewalls, 18, 20 and rests on a pair of brackets 24, 26 secured to the upper end portions 28, 30 of the sidewalls 18, 20, respectively. A pair of "c" shaped channels 23 extend upwardly from the upper end portions 28, 30 of the sidewalls 18, 20 and are designed to receive the pair of wheels 29, 31 extending from the sidewalls of the container 12. With this arrangement, the container 12 may be moved along the "c" shaped channels outside of the transit corridor 14 as required or necessary for maintenance purposes. Additionally, for installations where the system is utilized to only transport goods in only one direction, one way haulage scenarios, the return of the empty containers 12 can occur by the use of these "c" shaped channels 23 and the pair of wheels 29, 31 extending from the sidewalls of the container 12. Should such one way haulage scenarios be located where the transport system is not installed in a level, horizontal fashion but instead is installed such that the empty containers 12 travel from a higher elevation to a lower elevation, as in returning from the above ground surface to an underground mine, then gravity may be used to propel the empty container 12 as it travels in the "c" shaped channels 23.

As seen in FIG. 1, the transit corridor base 16, the pair of sidewalls 18, 20 and the top wall 22 are arranged to define an interior portion 32 for receiving the container 12. The base 16, sidewalls 18, 20 and top wall 22 of the transit corridor 14 are all made from a non-magnetic material such as concrete. As will be apparent from further discussion herein, the use of non-magnetic material for transit corridor construction is preferred to reduce magnetic interaction between the transit corridor itself and the permanent magnet arrangements used to levitate the container 12 within the transit corridor 14. The base 16 of the transit corridor 14 includes a first permanent magnet arrangement generally designated by the numeral 34. The first permanent magnet arrangement 34 may be imbedded in the base 16 as illustrated in FIG. 1 or it may be positioned to rest above the base 16 (not shown) if desired.

Figure 2:
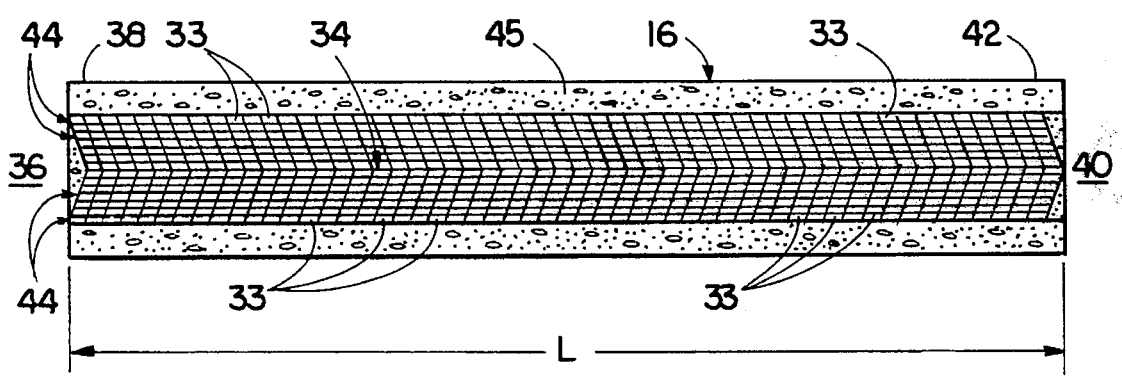
FIG. 2 is a top plan view of the base of the transit corridor as seen along line 2—2 of FIG. 1, being oriented ninety degrees and illustrating a chevron-shaped array of permanent magnets extending along the entire length of the transit corridor base.

As seen in FIG. 2, which is a view of the base 16 of the transit corridor 14 as seen along line 2—2 of FIG. 1 and oriented ninety degrees, the first permanent magnet arrangement 34 includes a chevron-shaped array of individual permanent magnets 33 which extend longitudinally along the base 16 of the transit corridor 14 over the entire length L of the base 16. The length L of the base 16 and thus the length of the transit corridor 14 is chosen to allow the permanent magnet levitation transport system 10 to transport material or personnel between a first location 36 adjacent to the first end portion 38 of the transit corridor 14 and a second location 40 adjacent to the second end portion 42 of the transit corridor 14. The chevron-shaped array of individual permanent magnets 33 is arranged in a series of columns 44 of permanent magnets 33 when the columns 44 are viewed longitudinally along the length L of the base portion 16. Each permanent magnet 33 in a particular column 44 has the same magnetic polarity orientation as every other permanent magnet 33 in the column. Columns adjacent to a particular column 44 of permanent magnets have the opposite magnetic polarity orientation. Thus, for example, if the first column 44 immediately adjacent the portion 45 of the base 16 is formed from individual permanent magnets 33 all of positive magnetic polarity, then the second column of individual permanent magnets 33 are all of negative magnetic polarity. All following columns 44 of individual permanent magnets 33 alternate in magnetic polarity as described.

As further seen in FIG. 2, the first permanent magnet arrangement 34 includes fourteen individual columns 44 of alternating positive and negative polarity permanent magnets 33. Each of the individual permanent magnets 33 is made from a sintered ferrite material such as ceramic-5 since sintered ferrite is less costly than other permanent magnet materials and, given the length L of the transit corridor 14 and the number of permanent magnets 33 used, the costs associated with using other forms of permanent magnets could make the overall cost of the transport system 10 prohibitive. Each of the columns 44 of permanent magnets 33 in the first permanent magnet arrangement 34 is spaced from adjacent columns by a distance of 2.54 cm and each of the individual magnets 33 in a particular column 44 is spaced from adjacent magnets in the same column by a distance of 2.54 cm. Each of the individual magnets 33 in the first permanent magnet arrangement 34 measures 5.08 cm in width by 15.24 cm in length and 5.08 cm in thickness. As is also seen in FIG. 2, each of the individual magnets 33 in a particular column 44 is staggered by 1 inch in a longitudinal direction relative to an adjacent magnet 33 in an adjacent column 44 to provide a traditional "rake" configuration or a chevron-shaped array. This longitudinal staggering occurs in all columns 44 except for the center two columns 44 in which pairs of magnets 33 are positioned in side-by-side relationship.

Again referring to FIG. 1, the container 12 positioned within the interior 32 of the transit corridor 14 includes a base 46 and a pair of vertically extending sidewalls 48, 50 extending upwardly from the base 46. The container 12 also includes a pair of spaced apart end walls (only end wall 52 shown in FIG. 1) which extend upwardly from the base 46 and between the sidewalls 48, 50 to form an open "box" for receiving a material such as mined coal 54. The base, the sidewalls 48, 50 and the end walls of the container 12 are all made from a non-magnetic material such as wood or plastic. As will be apparent from further discussion herein, the use of non-magnetic material for container construction is preferred to reduce magnetic interaction between the container itself and the permanent magnet arrangements used to levitate the container 12 within the transit corridor 14.

Figure 3:
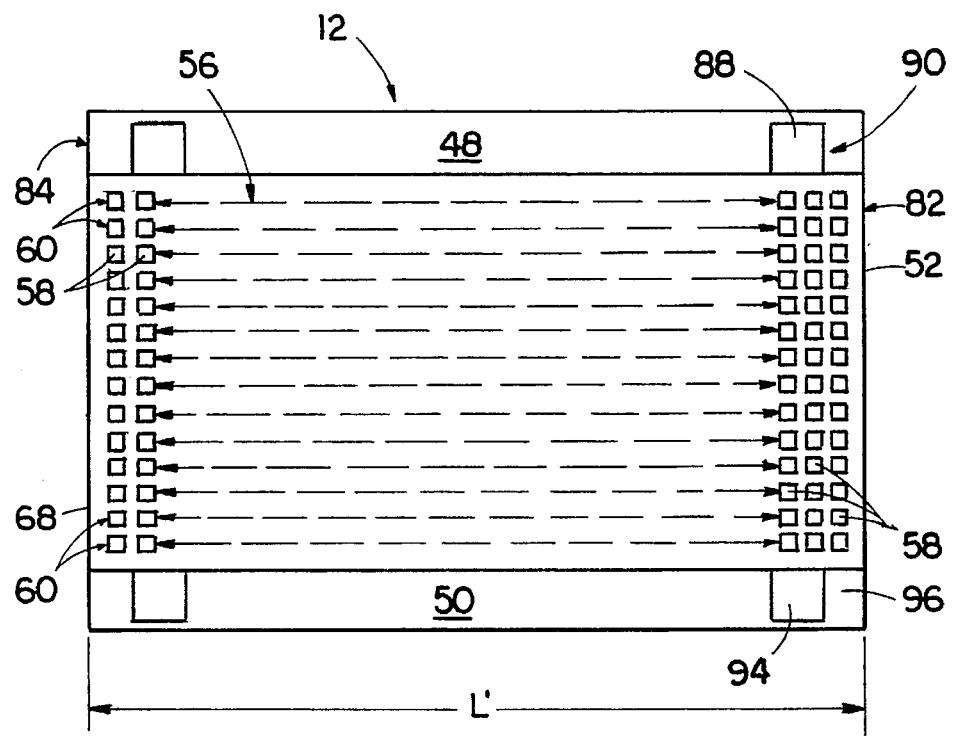
FIG. 3 is a plan view of the bottom of the container as seen along line 3—3 of FIG. 1, being oriented ninety degrees and illustrating a rectangular array of permanent magnets mounted on the bottom of the container.

A second permanent magnet arrangement 56 is secured beneath the base 46 of the container 12 and is located on the base 46 to be positioned directly above the first permanent magnet arrangement 34 mounted in the base 16 of the transit corridor 14. Now referring to FIG. 3, which is a bottom view of the container 12 as seen along line 3—3 of FIG. 1 with any reference to the transit corridor 14 removed for clarity and which is oriented ninety degrees, the second permanent magnet arrangement 56 includes a rectangular array of individual permanent magnets 58 which extend longitudinally along the base 46 of the container 12 over the entire length L' of the base 46. The rectangular-shaped array of individual permanent magnets 58 is arranged in a series of columns 60 of permanent magnets 58 when the columns 60 are viewed longitudinally along the length L' of the base portion 46. Each permanent magnet 58 in a particular column 60 has the same magnetic polarity orientation as every other permanent magnet 58 in the column. Columns adjacent to a particular column 60 of permanent magnets have the opposite magnetic polarity orientation. Thus, for example, if the first column 60 immediately adjacent the sidewall 48 of the container 12 is formed from individual permanent magnets 58 all of positive magnetic polarity, then the second column of individual permanent magnets 60 are all of negative magnetic polarity. All following columns 60 of individual permanent magnets 58 alternate in magnetic polarity as described. As seen in FIG. 3, the second permanent magnet arrangement 56 includes fourteen individual columns 60 of alternating positive and negative polarity permanent magnets 58. Each of the individual permanent magnets 58 is made from a neodymium-iron-boron material. Each of the columns 60 of permanent magnets 58 in the second permanent magnet arrangement 56 is spaced from adjacent columns by a distance of 2.54 cm and each of the individual magnets 60 in a particular column 60 is spaced from adjacent magnets in the same column by a distance of 5.08 cm. Each of the individual magnets 58 in the second permanent magnet arrangement 56 measures 5.08 cm in width by 5.08 cm in length and 2.54 cm in thickness.

Figure 4:
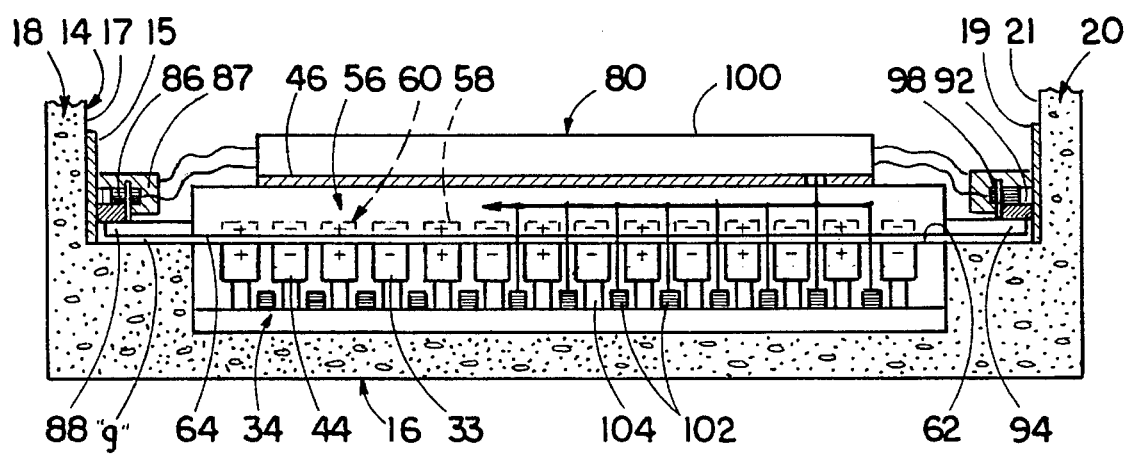
FIG. 4 is a detailed end view of the permanent magnet arrangement of the transit corridor base and the permanent magnet arrangement of the container and illustrating the noncontact lateral control system of the present invention including its power pick-up coils positioned between adjacent rows of the permanent magnets positioned on the transit corridor base.

Now referring to FIG. 4, there is illustrated a detailed end view of the first permanent magnet arrangement 34 located in the base 16 of the transit corridor 14 and the second permanent magnet arrangement 56 secured beneath the base 46 of the container 12. FIG. 4 presents the same orientation of the first and second permanent magnet arrangements 34, 56 as illustrated in FIG. 1 with all other components of the transport system 10 removed for clarity. As seen in FIG. 4, the first permanent magnet arrangement 34 includes the fourteen columns 44 of individual permanent magnets 33 previously described and each of the columns 44 has a magnetic polarity opposite to the magnetic polarity of its adjacent columns 44. The second permanent magnet arrangement 56 includes the fourteen columns 60 of individual permanent magnets 58 previously described and each of the columns 60 has a magnetic polarity opposite to the magnetic polarity of its adjacent columns 60. Each of the columns 44, 60 of the first and second permanent magnet arrangements 34, 56 is arranged so that each positive magnetic polarity column 44 of the first permanent magnet arrangement 34 lies directly beneath a positive magnetic polarity column 60 of the second permanent magnet arrangement 56. Since each column 44 in the first permanent magnet arrangement 34 lies directly beneath a column 60 in the second permanent magnet arrangement 56 of like magnetic polarity, a totally repulsive force is created between the first and second permanent magnet arrangements 34, 56. With the size and composition of the individual permanent magnets 33, 58 previously described, the repulsive force created is of a strength sufficient to levitate the container 12 within the transit corridor 14. It has been found that with the arrangement herein described, the weight of the material such as mined coal 54 held by the container 12 should be controlled to provide a minimum gap "g" of 1.5 cm between the facing surfaces 62, 64 of the first and second permanent magnet arrangements 34, 56.

Figure 5:
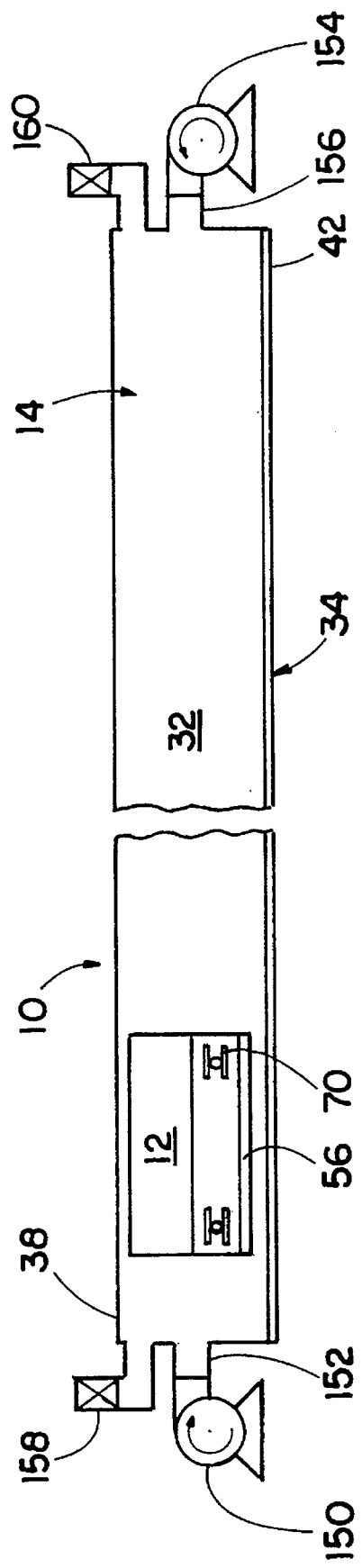
FIG. 5 is a schematic illustration of the container positioned within the transit corridor and a propulsion system communicating with the interior of the transit corridor for moving the container through the corridor.

With the container 12 levitated in the transit corridor 14 as illustrated in FIG. 1 due to the repulsive magnetic interaction between the first and second permanent magnet arrangements 34, 56, the container 12 may be moved through the transit corridor by application of a motive force to the container 12 delivered in a longitudinal direction through the transit corridor 14 by operation of a propulsion system illustrated schematically in FIG. 5. As seen in FIG. 5, the container 12 is positioned within the transit corridor 14 so that the second permanent magnet arrangement 56 associated with the container 12 is adjacent to the first permanent magnet arrangement 34 associated with the transit corridor 14. A forced air blower 150 is connected via a section of ductwork 152 to the interior portion 32 of the transit corridor 14 at the transit corridor 14 first end portion 38. The blower 150 is operable to generate a high volume of air which is forced through the ductwork 152 and into the interior portion 32 of the transit corridor 14 upon blower operation. A forced air blower 154 is connected via a section of ductwork 156 to the interior portion 32 of the transit corridor 14 at the transit corridor 14 second end portion 42. As with the blower 150, the blower 154 is operable to generate a high volume of air which is forced through the ductwork 156 and into the interior portion 32 of the transit corridor 14 upon blower 154 operation. A relief valve 158 communicates with the interior portion 32 of the transit corridor 14 at the transit corridor 14 first end portion 38 and a relief valve 160 communicates with the interior portion 32 of the transit corridor 14 at the transit corridor 14 second end portion 42.

In order to move the suspended container 12 through the transit corridor 14 from the position shown in FIG. 5 towards the second end portion 42 of the transit corridor 14, the blower 150 is activated and the relief valve 160 is opened to allow air generated by the blower 150 to flow through the interior portion 32 of the transit corridor 14 and "push" the container 12 through the transit corridor 14 as the generated air moves toward and thereafter passes through the relief valve 160. Conversely, to move the container 12 in an opposite direction, the blower 154 is activated and the relief valve 158 is opened to allow air generated by the blower 154 to flow through the interior portion 32 of the transit corridor 14 and "push" the container 12 through the transit corridor 14 as the generated air moves toward and thereafter passes through the relief valve 158.

During movement of the container 12 through the transit corridor 14, the totally repulsive force generated by the magnetic interaction between the first and second permanent magnet arrangements 34, 56 may cause the container 12 to move laterally within the transit corridor 14 towards one of the transit corridor sidewalls 18, 20.

Noncontact Lateral Control System of the Present Invention

In accordance with the present invention, there is provided a noncontact lateral control system illustrated in FIGS. 1 and 4, being generally designated by the numeral 80, operable to maintain the container 12 in a centered position laterally within the trans it corridor 14 during movement of the container 12 through the transit corridor 14. A portion of the noncontact lateral control system 80 is located at the first end portion 82 of the container 12 as the first end portion 82 is identified in FIG. 3 and is operable to control the lateral position of the first end portion 82 of the container 12 within the transit corridor 14. It should be understood that, although not specifically illustrated in the figures, an identical portion of the noncontact lateral control system is located at the second end portion 84 of the container 12 with the exception of the system's control unit which is common to both first and second end portions 82, 84. The lateral control system located at the second end portion 84 of the container 12 is operable to control the lateral position of the second end portion 84 within the transit corridor 14. The following discussion will reference only the portion of the lateral control system 80 utilized to control the lateral position of the first end portion 82 of the container 12 within the transit corridor 14, but it should be understood that the control system located at the second end portion 84 of the container 12 operates in an identical manner.

Now referring to FIGS. 1, 3 and 4, the noncontact lateral control system 80 includes a proximity sensor 86 mounted on a bracket member 88 extending from the corner portion 90 of the container 12 first end portion 82 so that the proximity sensor 86 faces the steel siderail 15 secured to the inside surface 17 of the transit corridor sidewall 18. A first electromagnet 87 is also mounted on the bracket member 88 and is positioned to face the steel siderail 15 secured to the inside surface 17 of the transit corridor sidewall 18.

The noncontact lateral control system 80 further includes a proximity sensor 92 mounted on a bracket member 94 extending from the corner portion 96 of the container 12 first end portion 82 so that the proximity sensor 92 faces the steel siderail 19 secured to the inside surface 21 of the transit corridor sidewall 20. A second electromagnet 98 is also mounted on the bracket member 94 and is positioned to face the steel siderail 19 secured to the inside surface 21 of the transit corridor sidewall 20.

In the noncontact lateral control system of the present invention, the proximity sensor 86 itself is a conventional 0–20 ma (milliampere) device and operates to continually sense the distance between itself and the steel siderail 15. The proximity sensor 86 generates a linear output signal proportional to this sensed distance. The proximity sensor 92 itself is also a conventional 0–20 ma device and operates to continually sense the distance between itself and the steel siderail 19. The proximity sensor 92 generates a linear output signal proportional to this sensed distance. The difference in magnitudes between the linear output signal generated by the first proximity sensor 86 and the linear output signal generated by the second proximity sensor 92 is representative of the lateral position of the first end portion 82 of the container 12 within the transit corridor 14. If the linear output signal generated by the first proximity sensor 86 is greater that the linear output signal generated by the second proximity sensor 92, then the container 12 is farther from the first transit corridor sidewall 18 than the second transit corridor sidewall 20. If the linear output signal generated by the second proximity sensor 92 is greater than the linear output signal generated by the first proximity sensor 86, then the container 12 is farther from the second transit corridor sidewall 20 than to the first transit corridor sidewall 18.

The linear output signals generated by the first and second proximity sensors 86, 92 are received by a lateral control unit 100 positioned within the interior 32 of the container 12 on the container base 46. Within the lateral control unit 100, a lateral position signal representative of the actual lateral position of the first end portion 82 of the container 12 within the transit corridor 14 is determined (the amount by which the container 12 is off-center within the transit corridor). The lateral control unit 100 also determines which of the first and second proximity sensors 86, 92 has provided the larger linear output signal in order to determine in which direction the container 12 is off-center. For example, if the lateral control unit 100 determines that the linear output signal provided by the first proximity sensor 86 is larger in magnitude than the linear output signal provided by the second proximity sensor 92, then the lateral control unit 100 concludes that the container 12 is off-center in a direction towards the siderail 19. If this is the case, the lateral control unit 100 provides an output signal to the first electromagnet 87, which is a DC (direct current) bi-polar electromagnet, to energize the electromagnet 87 and create a magnetic attraction between the electromagnet 87 and the steel siderail 15 of sufficient strength to move the first end portion 82 of the container 12 through magnetic action towards the steel siderail 15 until the container 12 is centered in the transit corridor 14. The magnitude of the output signal provided to the first electromagnet 87 is proportional to the magnitude of the difference between the linear output signal provided by the first proximity sensor 86 and the linear output signal provided by the second proximity sensor 92. The greater the difference in magnitude, the stronger the output signal provided by the lateral control unit 100 to the first electromagnet 87.

On the other hand, if the lateral control 100 determines that the linear output signal provided by the second proximity sensor 92 is larger in magnitude than the linear output signal provided by the first proximity sensor 86, then the lateral control unit 100 concludes that the container 12 is off-center in a direction towards the siderail 15. If this is the case, the lateral control unit 100 provides an output signal to the second electromagnet 98, which is also a DC bi-polar electromagnet, to energize the electromagnet 98 and create a magnetic attraction between the electromagnet 98 and the steel siderail 19 of sufficient strength to move the first end portion 82 of the container 12 through magnetic action towards the steel siderail 19 until the container 12 is centered in the transit corridor 14. The magnitude of the output signal provided to the second electromagnet 98 is proportional to the magnitude of the difference between the linear output signal provided by the second proximity sensor 92 and the linear output signal provided by the first proximity sensor 86. The greater the difference in magnitude, the stronger the output signal provided by the lateral control unit 100 to the second electromagnet 98.

As described, the first and second proximity sensors 86, 92 and the first and second electromagnets 87, 98 operate in conjunction with the lateral control unit 100 to control the lateral position of the container 12 within the transit corridor 14. Power to operate the lateral control unit 100, the proximity sensors 86, 92 and the electromagnets 87, 98 is provided by an onboard DC power source and/or a series of individual conductors, perhaps coils 102, attached mechanically to the base 46 of the container 12 and electrically connected with the lateral control unit 100. As seen in FIG. 4, each of the permanent magnets 33 of the first permanent magnet arrangement 34 is positioned on a pedestal 104 to elevate the permanent magnets 33 and allow the coils 102 to pass easily between adjacent columns 44 during movement of the container 12. During movement of the container 12 through the transit corridor 14, each of the hanging coils 102 intersects the magnetic fields present between the individual columns 44 of permanent magnets 33 forming the first permanent magnet arrangement 34. The current induced in the coils 102 by the coil-magnetic field interaction is converted within the lateral control unit 100 to the necessary voltages and then distributed to the proximity sensors, electromagnets and the lateral control unit itself. In the event the noncontact lateral control system 80 fails for any reason, backup centering wheels 110 secured to the sidewalls 48, 50 are operable to maintain the container 12 in proper position laterally within the transit corridor 14.

The foregoing description included a description of a container 12 and a second permanent magnet arrangement 56 associated with the container 12, and a transit corridor 14 and a first permanent magnet arrangement 34 associated with the transit corridor 14 for ease of describing and understanding the present invention. However, it should be understood that the first and second permanent magnet arrangements may be interchanged so that the first permanent magnet arrangement 34 is associated with the container 12 and the second permanent magnet arrangement 56 is associated with the transit corridor 14 without affecting the operability and effectiveness of the present invention.

It is thought that the present invention and many of its attendant advantages will be understood from the foregoing description and it will be apparent that various changes may be made in the form, construction and arrangement of the parts of the invention described herein without departing from the spirit and scope of the invention or sacrificing all of its material advantages, the form hereinbefore described being merely a preferred or exemplary embodiment thereof.

We claim:

1. In a levitation-type transport system including a transit corridor having a pair of spaced apart first and second sidewalls, a container having first and second end portions and positioned within said transit corridor, means for levitating said container within said transit corridor and a propulsion system associated with said transit corridor for moving said levitated container through said transit corridor, a noncontact lateral control system for preventing said levitated container from contacting said transit corridor first and second sidewalls as said levitated container is moved therethrough, comprising:

(a) first proximity sensor means associated with said first end portion of said container operable to sense the lateral position of said first end portion of said container within said transit corridor relative to said transit corridor first and second sidewalls and provide a first linear output signal means representative of the sensed lateral position of said container first end portion;

(b) second proximity sensor means associated with said second end portion of said container operable to sense the lateral position of said second end portion of said container within said transit corridor relative to said transit corridor first and second sidewalls and provide a second linear output signal means representative of the sensed lateral position of said container second end portion;

(c) first electromagnet means associated with said container first end portion;

(d) second electromagnet means associated with said container second end portion; and (e) controller means for receiving said first linear output signal means from said first proximity sensor means, calculating the actual lateral position of said container first end portion within said transit corridor based on the value of said first linear output signal means and providing in response to said calculated actual lateral position of said container first end portion within said transit corridor a first output signal to said first electromagnet means operable to energize said first electromagnet means and create a magnetic attraction between said first electromagnet means and one of said transit corridor first and second sidewalls of sufficient strength to move said container first end portion through magnetic action laterally within said transit corridor until said container first end portion is centered laterally within said transit corridor; and (f) controller means for receiving said second linear output signal means from said second proximity sensor means, calculating the actual lateral position of said container second end portion within said transit corridor based on the value of said second linear output signal means and providing in response to said calculated actual lateral position of said container second end portion within said transit corridor a second output signal to said second electromagnet means operable to energize said second electromagnet means and create a magnetic attraction between said second electromagnet means and one of said transit corridor first and second sidewalls of sufficient strength to move said container second end portion through magnetic action laterally within said transit corridor until said container second end portion is centered laterally within said transit corridor, said levitation means including a first permanent magnet arrangement positioned on said transit corridor and a second permanent magnet arrangement connected to said container;

wherein the electric power required to operate each of said pair of first and second proximity sensor means and each of said pair of first and second electromagnet means is provided by a series of wire conductors connected with said first and second controller means, suspended from said container and intersecting magnetic fields generated by said first permanent magnet arrangement.

2. The noncontact lateral control system as recited in claim 1, wherein:

said first permanent magnet arrangement includes an array of columns of individual permanent magnets of alternating positive and negative polarity; and said wire conductors being suspended from said container and positioned adjacent each pair of adjacent columns of positive and negative polarity permanent magnets to intersect the magnetic field surrounding said adjacent columns.

* * * * *